July 14, 1959   C. J. MERL   2,894,473
REMOTE CONTROL STEERING MECHANISM FOR BOATS
Filed March 28, 1955   2 Sheets-Sheet 1

Inventor
Carl J. Merl
By
Charles L. Lorenchuk Attorney

July 14, 1959        C. J. MERL        2,894,473

REMOTE CONTROL STEERING MECHANISM FOR BOATS

Filed March 28, 1955        2 Sheets-Sheet 2

INVENTOR.
Carl J. Merl
BY Charles L. Lovehed
attorney

United States Patent Office 2,894,473
Patented July 14, 1959

2,894,473

REMOTE CONTROL STEERING MECHANISM FOR BOATS

Carl J. Merl, Erie, Pa.

Application March 28, 1955, Serial No. 497,275

2 Claims. (Cl. 114—144)

This invention relates to controls and more particularly to controls for steering boats and other devices where it is desirable to move a control member from one position to another.

It is an object of this invention to overcome the difficulties and inconveniences in prior devices, especially steering devices, and, more particularly, it is an object of this invention to provide a steering device for a boat which is simple in construction, economical to manufacture, and simple and efficient to use.

Another object of the invention is to provide a control wherein a motor drives a reversing worm to selectively move a control member.

Another object of this invention is to provide a control wherein two motors drive a control member, one motor driving in the same direction as the other motor.

A further object of the invention is to provide an improved remotely controlled controlling device.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
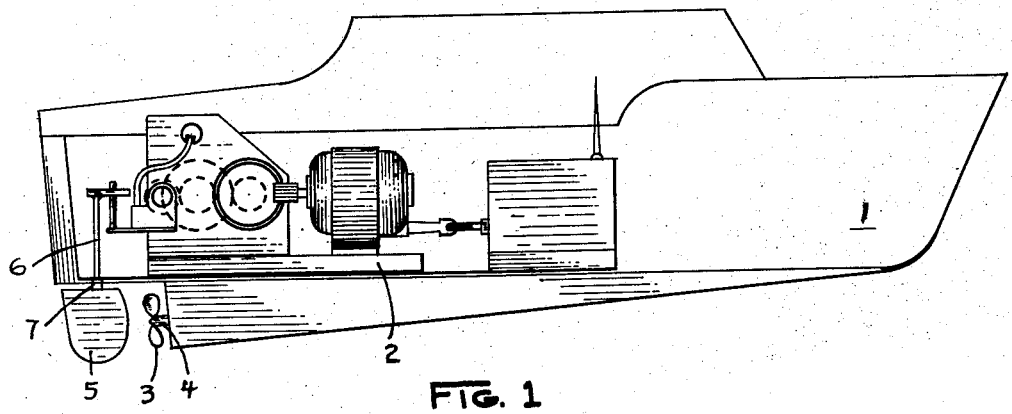
Fig. 1 is a side view of the device according to the invention installed in a boat.
Figure 2:
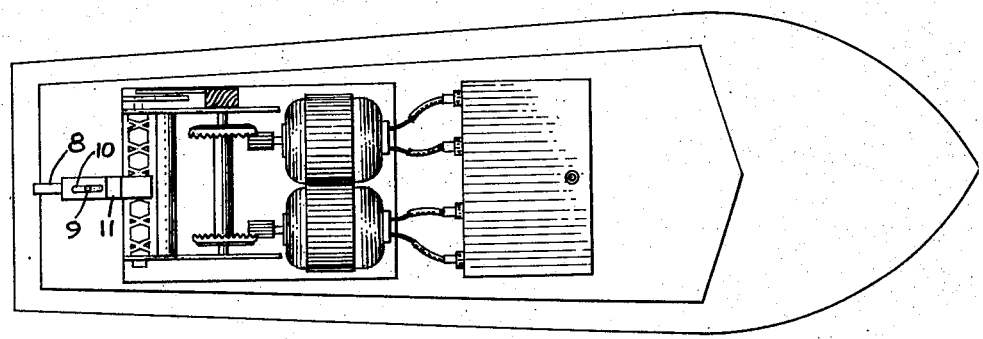
Fig. 2 is a top view of the device shown in Fig. 1.
Figure 3:
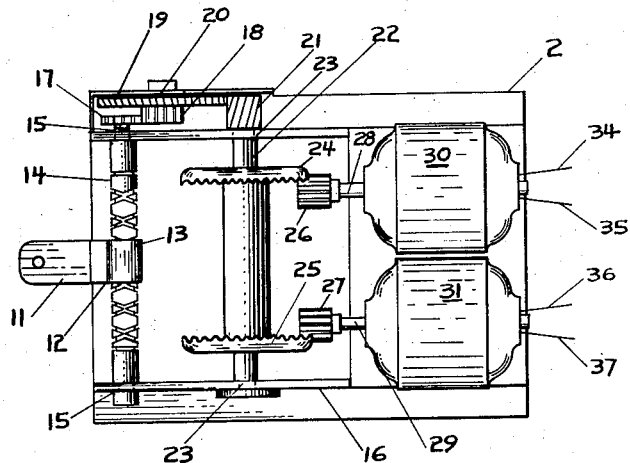
Fig. 3 is an enlarged side view of the control device.
Figure 4:
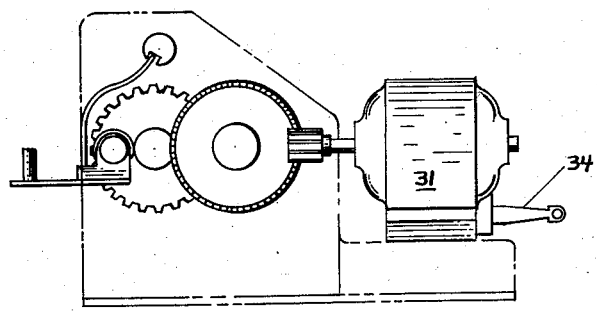
Fig. 4 is a side view of the control.
Figures 5, 6:
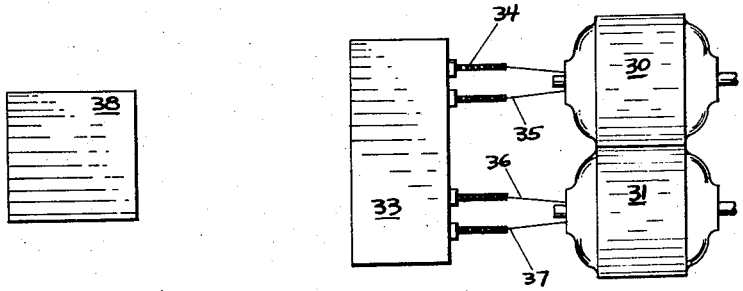

Fig. 5 indicates the radio transmitter; and

Fig. 6 indicates the receiver and motor control.

Now with more specific reference to the drawings, the boat 1 has a control steering mechanism 2 supported therein and has a propeller 3 driven by a shaft 4 which is operated by a motor mounted in the boat 1 which constitutes no part of this invention. The boat 1 has a rudder 5 pivotally mounted in bearings 7 and having a shaft 6 fixed to the rudder 5. The shaft 6 has a crank 8 attached thereto having a crank pin 9 operable in a slot 10 in a slide member or follower 11. The follower 11 is fixed at 12 to a nut 13 which operates on a reverse worm shaft 14. The reverse worm shaft 14 is carried by a shaft having bearings 15 in a frame 16. A spur gear 17 is fixed to the end of the shaft and it meshes with a gear 18 fixed to large gear 19. Gears 18 and 19 are supported on a bearing 20 to rotate in the frame 16. The large gear 19 meshes with a spur gear 21 which is attached to the end of a shaft 22. The shaft 22 has bearings 23 which support it in the frame 16. Ring gears 24 are fixed to rotate with the shaft 22 and mesh with pinions 26 and 27, respectively. Shafts 28 and 29 drive the pinions 26 and 27 from motors 30 and 31. Motors 30 and 31 are operated from a radio receiver actuating device 33 which is connected to the motors 30 and 31 through leads 34 and 35 and through leads 36 and 37, respectively. The radio receiver 33 may be of any suitable type and may be a receiver of the general type shown in Patent No. 2,441,568 and the radio receiver receives a signal from the radio transmitter 38 which may be located at a point from the receiver 33. The receiver 33 has proper relays such as spaced contacts 67 and 68 of the said patent which may be connected to reverse the motor for switching the drive motor 30 in one direction or drive motor 31 in the same direction, depending upon the signal controlled by the operator from the radio transmitter 38 as to whether the signal drives the motor 30 or 31. Since the ring gears 24 and 25 have opposite sides from each other, the same direction of rotation of one motor will drive the shaft 22 in a direction opposite the direction it will be driven by the other motor. Radio equipment of the type described herein is familiar in the art to persons familiar with toy boats and toy airplanes.

In operation, when it is desired to turn the boat 1 to the right, the operator will send from the radio transmitter 38 a radio signal which will be received by the radio receiver 33 and the motor 30 will be caused to drive in, for example, a counterclockwise direction. This will drive the gear 24 in a clockwise direction and, therefore, the gear 21 will drive in a clockwise direction, the gears 18 and 19 will drive in a counterclockwise direction, and the gear 17 will drive in a clockwise direction, driving worm shaft 14 clockwise and causing the nut 13 to move, for example, to the left. This will cause the rudder 5 to rotate counterclockwise, looking downward, and this will drive the boat 1 to the right.

During the time that motor 30 is running, the motor 31 will act as a brake to bring the gearing to an immediate stop when the power is turned off from motor 30. Further, the two motors, being in parallel, tend to balance the system and give a greater stability to the control. Further, the two motors cut down the possibility of failure since the direction of movement of the rudder 5 can be reversed by continuing to drive one motor 30 or 31 in the same direction until the nut 13 has reached the end of its travel and moved back in the opposite direction to the desired position. In other words, the boat 1 can be controlled to the right or to the left with one motor.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a boat and a control therefor comprising a rudder disposed at the rear portion of said boat and having a shaft attached thereto to rotate said rudder, a crank on said shaft, a worm shaft, a nut on said worm shaft, the distal end of said crank being connected to said nut and movable therewith, means to rotate said worm selectively in either direction, said means comprising a shaft spaced from said worm shaft and parallel thereto, two spaced ring gears on said shaft, two motors disposed in said boat in side by side relation therein with their shafts disposed parallel to each other and perpendicular to said shaft having said ring gears thereon, a pinion on the shaft of each said motor, each said pinion engaging one said ring gear, each said ring gear being operatively connected to a motor, one said motor adapted to be excited to drive said shaft in one direction and the other motor adapted to drive said shaft in the other direction, and a radio receiver mounted in said boat and connected to said motors, said radio receiver having means to selectively drive said motors in either direction of rotation, moving said rudder to control the direction of travel of said boat.

2. A control for a steering mechanism comprising a reverse worm shaft, a nut on said worm shaft, said nut being driven from side to side on said worm shaft, means to connect said nut to a steering mechanism, a second shaft, a first and a second ring gear on said second shaft, said second shaft being disposed parallel to said worm shaft, gear means for connecting said worm shaft to said second shaft, a first and a second motor, said motors having their shafts disposed perpendicular to said worm shaft and to said second shaft, gear means on each said motor shaft engaging one said ring gear, and a radio control connected to said motors to drive the first said motor in a first direction while the second said motor is driven from said first motor through said ring gear and to drive the second said motor in a second direction while said first motor is driven by said second motor.

References Cited in the file of this patent

UNITED STATES PATENTS

| | | |
|---|---|---|
| 6,507 | Reed | June 5, 1849 |
| 385,259 | Fiske | June 26, 1888 |
| 1,569,927 | Hammond | Jan. 19, 1926 |
| 1,665,011 | Barrett | Apr. 13, 1928 |
| 2,330,486 | Fuller | Sept. 28, 1943 |
| 2,441,568 | Finison | May 18, 1948 |

FOREIGN PATENTS

| | | |
|---|---|---|
| 221,998 | Great Britain | Sept. 25, 1924 |